UNITED STATES PATENT OFFICE.

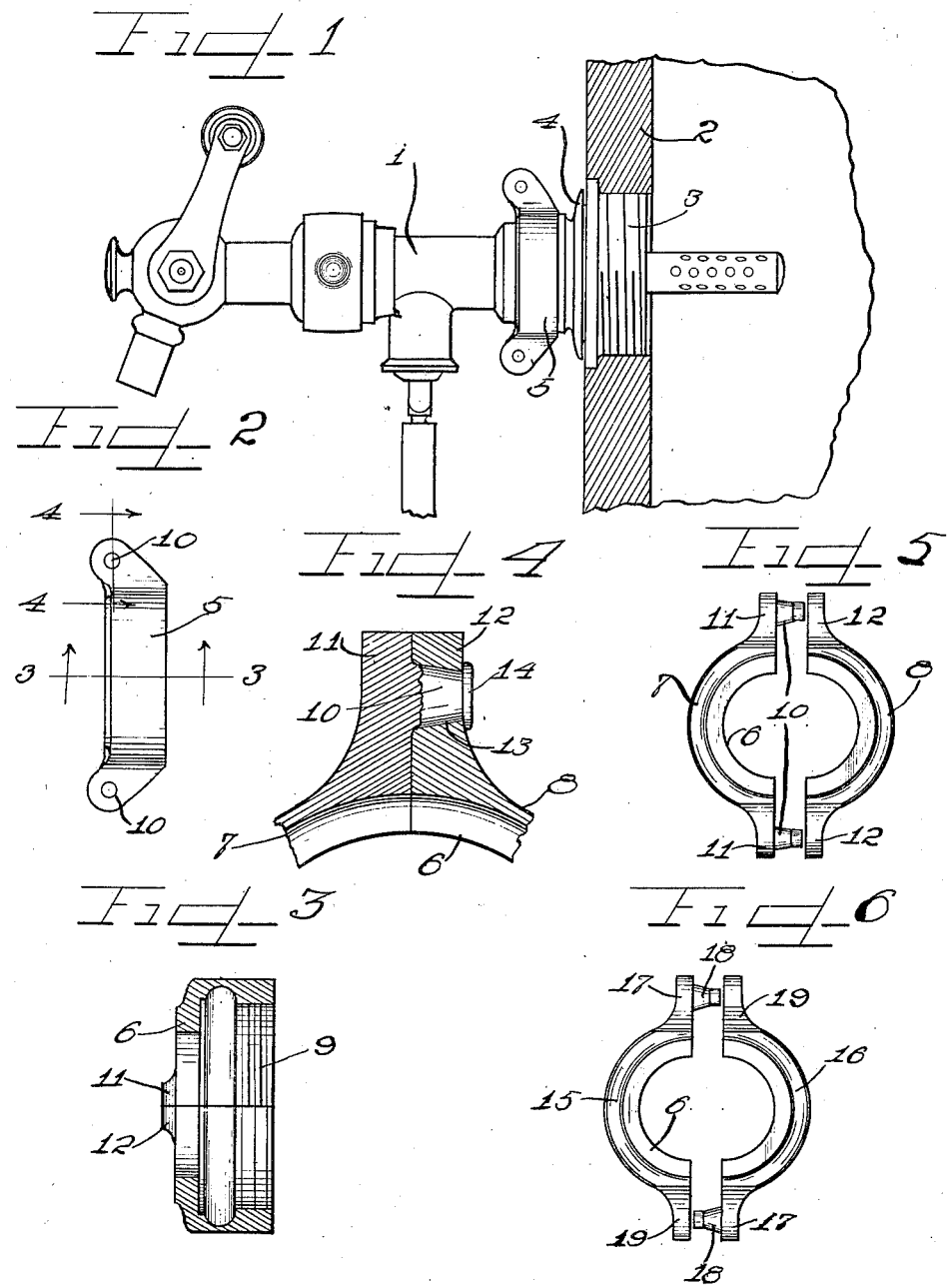

FRANK E. RICE, OF DETROIT, MICHIGAN, ASSIGNOR TO AMERICAN TAP BUSH CO., OF DETROIT, MICHIGAN, A CORPORATION OF MICHIGAN.

COUPLING-RING.

1,364,313.  Specification of Letters Patent.  Patented Jan. 4, 1921.

Application filed October 26, 1918. Serial No. 259,886.

*To all whom it may concern:*

Be it known that I, FRANK E. RICE, a citizen of the United States, and a resident of the city of Detroit, in the county of Wayne and State of Michigan, have invented certain new and useful Improvements in Coupling-Rings; and I do hereby declare that the following is a full, clear, and exact description of the same, reference being had to the accompanying drawings, and to the numerals of reference marked thereon, which form a part of this specification.

My invention has reference more particularly to a coupling ring for connecting a tap or the like to a keg or container, said ring being made of sections, which are clamped together on the inner end of the tap so as to turn freely thereon and screw onto the intermediate connector with which the bung hole of the container is provided.

It is an object of my invention to provide a coupling ring for a tap or similar device, which is constructed in an improved manner to facilitate assembling.

Another object of my invention is to provide a coupling ring for a tap or the like, comprising two parts having integral tapered pins and tapered perforations therefor which are adapted to perfectly center or locate the two parts of the coupling with reference to one another, and wherein the integral pins serve as rivets to hold the two parts together.

My invention also has other important objects which will appear from the following specification and the accompanying drawings.

On the drawings:

Figure 1 is a side view of a detachable beer tap mounted for use, and embodying my invention.

Fig. 2 is a side view of my improved coupling ring.

Fig. 3 is an enlarged sectional view on the line 3—3 of Fig. 2.

Fig. 4 is an enlarged fragmentary sectional view on the line 4—4 of Fig. 2.

Fig. 5 is a front view of the two half sections of my improved coupling ring before assembling.

Fig. 6 is a view similar to Fig. 5, showing a modified form of my invention.

As shown on the drawings:

The reference numeral 1, indicates a tap of well-known construction, and 2, a fragmentary portion of a keg or other container to which it is attached, said keg having a bung hole plug or bushing 3, with which the thimble 4, is detachably connected in the usual manner, as, for example, by means of a bayonet joint, and said thimble is externally threaded at the outer end to have the coupling 5, turned thereon in the usual manner.

The coupling ring 5, is permanently secured on the inner end of the tap 1, by means of the inturned flange 6, with which the ring is provided and which is seated in an annular groove at the inner end of the tap 1, and in order to enable the ring 5, to be connected on the tap 1, the said ring is made in two half sections 7 and 8, each of which has matching ears at the opposite sides thereof which are adapted to be joined with the corresponding ears of the other half section to clamp the sections together and the ring onto the inner end of the top 1. The inner end of the ring is internally threaded as at 9, so as to screw onto the outer end of the thimble 4, and it is not only necessary that the half sections of the ring may be joined securely together but that they may be so joined to provide a smooth unbroken thread in the interior thereof. For this purpose the half ring 7, has a tapered pin 10, projecting from each of the ears 11, thereof and each of the ears 12, of the half ring 8, are provided with tapered perforations in which the tapered pins 10, engage so as to locate the half sections of the ring properly with reference to one another, and the ends of the pins 10, which project through the openings 13, in the ears 12, are riveted over as at 14, to secure the half sections of the ring securely together.

In order to facilitate production and assembling of the ring, and to afford a superior construction, the pins 10, are cast integrally with the ears of the ring 7, so that the workman is not required to bother with separate pins or rivets in assembling, and both of the pins 10, are preferably provided on the same half of the ring so that when the two half rings are placed together, the structure may be set upon a block or otherwise held and the two pins riveted without changing the position of the ring. The use of integral pins also serves to provide a more secure connection between the half sections of the ring, as play or looseness between the pins and at least one of the rings is thereby avoided.

In Fig. 6, I have shown a modified form in which the coupling ring may be constructed, in which the two half sections 15 and 16, thereof each has an ear 17, having the pin 18, integral therewith, and each ring has a perforated ear 19, opposite the ear 17, of the other half section, which is adapted to be secured to the ear 17, by means of the rivet 18.

With this construction, the same pattern, and consequently the same casting may be used for both half sections, and it is unnecessary to provide two different kinds of castings for each ring as in the preceding structure, but unlike the preceding structure, it is necessary to first rivet the one side of the ring, and then reverse the position of the ring and rivet the other side.

While I have shown and described my invention in a preferred form, I am aware that various changes and modifications may be made therein without departing from the principles of my invention, and I therefore do not purpose limiting the patent granted hereon otherwise than necessitated by the prior art.

I claim as my invention:

A coupling ring made in two similar half sections having annular grooves therein, each section comprising an internally threaded semi-circular member provided with an extending wing on each end thereof, said wing adapted to be secured to a corresponding wing on the other section, one of said wings being pierced with a hole and the other wing being provided with an integral tapered pin adapted to form a rivet upon assembling the ring.

In testimony whereof I have hereunto subscribed my name in the presence of two subscribing witnesses.

FRANK E. RICE.

Witnesses:
  LAWRENCE REIBSTEIN,
  EARL M. HARDINE.